United States Patent [19]

Blinman

[11] 4,362,173

[45] Dec. 7, 1982

[54] CASHMERE COMBING MACHINE

[75] Inventor: Daryl J. Blinman, Glenfield, Australia

[73] Assignee: Minister for Public Works for the State of New South Wales, Sydney, Australia

[21] Appl. No.: 247,561

[22] PCT Filed: Aug. 1, 1980

[86] PCT No.: PCT/AU80/00042

§ 371 Date: Mar. 17, 1981

§ 102(e) Date: Mar. 17, 1981

[87] PCT Pub. No.: WO81/00339

PCT Pub. Date: Feb. 19, 1981

[30] Foreign Application Priority Data

Aug. 3, 1979 [AU] Australia .................................. PD9820

[51] Int. Cl.³ .............................................. A45D 1/00
[52] U.S. Cl. ..................... 132/9; 132/11 R; 132/45 R; 119/94; 132/11 A
[58] Field of Search ................. 132/11 R, 11 A, 9; 119/94

[56] References Cited

U.S. PATENT DOCUMENTS 1,149,481 2/1915 Vandergon .
3,066,683 12/1962 Pace ................................. 132/11 R
3,386,453 6/1968 Roberts et al. .................. 131/11 R
3,750,680 8/1973 Miller .............................. 132/11 R Primary Examiner—G. E. McNeill
Attorney, Agent, or Firm—Ladas & Parry

[57] ABSTRACT

An apparatus for the removal of hair from an animal. The apparatus includes a driven comb unit for collecting the hair and a housing for the comb within which the comb unit is arranged to be driven. The housing has an inlet which exposes the comb unit so that it can be moved through the hair of the animal, an outlet for the discharge of hair collected from the animal and an arrangement permitting connection of the outlet to a suction part.

The comb unit comprises at least one comb which in turn comprises a comb spine to which are attached a plurality of fingers which are each tapered convergently towards tips thereof. Each finger being bent part way along its length. Each comb is mounted on a rotatable hub member in such way that each comb is substantially freely pivotally displaceable through an arc of movement for all rotary positions of the hub member. The suction part is arranged to cause a flow of air past each comb after it has been moved through the hair of the animal to remove therefrom any hair collected by it.

13 Claims, 4 Drawing Figures

CASHMERE COMBING MACHINE

TECHNICAL FIELD

This invention relates to a method of and apparatus for removal of hair from animals.

BACKGROUND ART

An important application of this invention is its use in the collection of cashmere. Cashmere is the fine diameter, non-medullated, wool-like fibres, varying in length from 2.5 to 9 cms which occur in the undercoat of goats.

The process of harvesting cashmere comprises collection of the cashmere fibres at a time when the goat is shedding them, so that the process is more one of separating the fine shedding hair from coarser hair in the goat's coat using a combing process, rather than one of cutting the fibres, or pulling them out from the follicles.

All the world's production of cashmere is currently hand-combed, and this manual process takes about 30 minutes per goat. Since goat-hair is usually matted and tangled, this manual procedure is very time-consuming, tedious and physically demanding, and results in a relatively expensive product.

This invention may also be used to facilitate the removal of wool from sheep which have been treated especially to enable such removal. Prior art sheep shearing techniques are labour intensive and it is desirable to reduce the labour cost of sheep shearing.

For the purposes of this specification "hair" is to be taken to mean any slender threadlike outgrowth of the epidermis of an animal and includes fur, fleece etc.

The present invention therefore seeks to provide an improved method of and apparatus for removal of hair from animals.

DISCLOSURE OF INVENTION

In accordance with one aspect of the present invention there is provided apparatus for the removal of hair from an animal comprising driven comb means for collecting the hair and a housing for the comb means and within which the comb means is arranged to be driven, the housing having an inlet which exposes the comb means so that it can be moved through the hair of the animal, an outlet for the discharge of hair collected from the animal and means permitting connection of the outlet to a suction means so that when in use the suction means creates an air flow which is applied to the collected hair to facilitate its removal from the comb means; characterised in that the comb means comprises at least one comb which in turn comprises a comb spine to which is attached a plurality of fingers which are each tapered convergently towards tips thereof, each finger being bent part way along its length such that in use the tip of each finger is inclined in the direction of travel of the comb through the hair of the animal.

Preferably, the or each said comb is mounted on a rotatable hub member with the spine of each comb disposed substantially parallel to the axis of rotation of the hub member, the suction means being arranged to cause a flow of air past the or each said comb after it has been moved through the hair of the animal, to remove therefrom any hair collected by it.

Preferably, the apparatus is arranged so that centrifugal forces act on the collected hair assisting in its removal from the comb or combs.

Two such combs may be used in the apparatus and to secure them to the hub member each comb may be attached to a shelf plate which is in turn pivotally mounted to the rotatable hub, with the axis of rotation of each shelf plate about its respective pivotal mounting being substantially parallel to the axis of rotation of the hub. Alternatively the combs may be pivotally mounted to the rotatable hub and the shelf plates may be attached to the combs.

Preferably, the rotatable hub member is driven by an electric motor or the like located within the rotatable hub member or elsewhere on the apparatus. Alternatively, however, power to drive the hub may be obtained from any suitable remote source and transmitted to the apparatus, via a flexible rotary drive connection.

The tips of the comb fingers are preferably bent at an angle of substantially 30° to the original axis, though other angles of bending also may be used. Further, the hub member is preferably configured so that normally the tips pass through the hair on the animal being combed at an angle of about 15° to a line normal to the direction of motion of the comb, in the leading sense.

Preferably, the suction means is a suction device such as a vacuum cleaner arranged to provide the required suction to cause the flow of air past the combs to remove the collected hair.

Preferably, circular side plates are secured to the rotatable hub member in a spaced apart parallel coaxial relation and disposed in planes normal to the axis of rotation of the hub and on either side of the combs, and assembly pieces are arranged to extend around the rotatable hub and are secured thereto between respective combs. In this configuration, the combs or shelf plates may be pivotally mounted to the side plates at points immediately adjacent to the rotatable hub.

Preferably the apparatus housing is arranged to totally enclose the rotatable hub and the combs, shelf plates and side plates associated therewith, except for an opening in the front of the housing and said connection means or manifold for the connection of said suction means. Said housing and said shelf plates are preferably arranged to provide a reduced cross section air path for the flow of air past each comb to remove the hair therefrom. Also, an adjustable face plate may be secured to the apparatus housing to allow control of the depth of penetration of the combs into the animal's coat.

The hub may be rotated at speeds between 1500 and 2000 rpm but a speed of about 1800 rpm is preferred.

Weights may be fixed to the shelf plates to increase the centrifugal forces acting on the comb assemblies and thereby allowing a reduction in the speed of rotation of the hub necessary to achieve satisfactory combing.

In accordance with another aspect of the invention there is provided an apparatus for the removal of hair from an animal comprising driven comb means for collecting the hair and a housing for the comb means and within which the comb means is arranged to be driven, the housing having an inlet which exposes the comb means so that it can be moved through the hair of the animal, an outlet for the discharge of hair collected from the animal, and means permitting connection of the outlet to a suction means so that when in use the suction means creates an air flow which is applied to the collected hair to facilitate its removal from the comb means; characterised in that the comb means comprises at least one comb in turn comprising a spine and a plurality of comb fingers, the comb or combs being mounted on means to impart continuous closed-loop rotary movement of the comb or combs about an axis, the spine of the or each comb being located generally parallel to the axis of the movement, the suction means being arranged to cause a flow of air past the or each said comb after it has been moved through the hair of the animal to remove therefrom any hair collected thereon.

Preferably the comb fingers are tapered convergently towards tips thereof and each finger is bent part way along its length so that in use the tip of each finger is inclined in the direction of the travel of the comb through the hair of the animal.

Preferably the means to provide the continuous closed-loop rotary movement about an axis comprises a rotatable hub member to which the combs are fixed.

In accordance with another aspect of the invention there is provided a method of collection of hair from an animal using the apparatus as described above, comprising moving the driven comb means in relation to the hair on the animal to collect the hair thereon, and applying suction means to remove the collected hair from the comb means and housing.

Preferably, when the method is used for collection of cashmere, the opening at the front of the housing is held against the goat's coat at the top of its back and near the goat's spine, whence the apparatus is moved vertically downward as far as possible, while maintaining engagement of the housing with the goat's coat. The machine is then raised to the level of the spine again and the process is repeated.

The method may be used in collection of wool from sheep, where the animal is specially treated to create a weak point in the wool fibres close to the sheep's skin, thus allowing the combing out of the wool according to the above method.

BRIEF DESCRIPTION OF DRAWINGS

A preferred form of the invention will now be described with reference to the accompanying drawings wherein.

BEST MODE OF CARRYING OUT THE INVENTION

Figure 1:
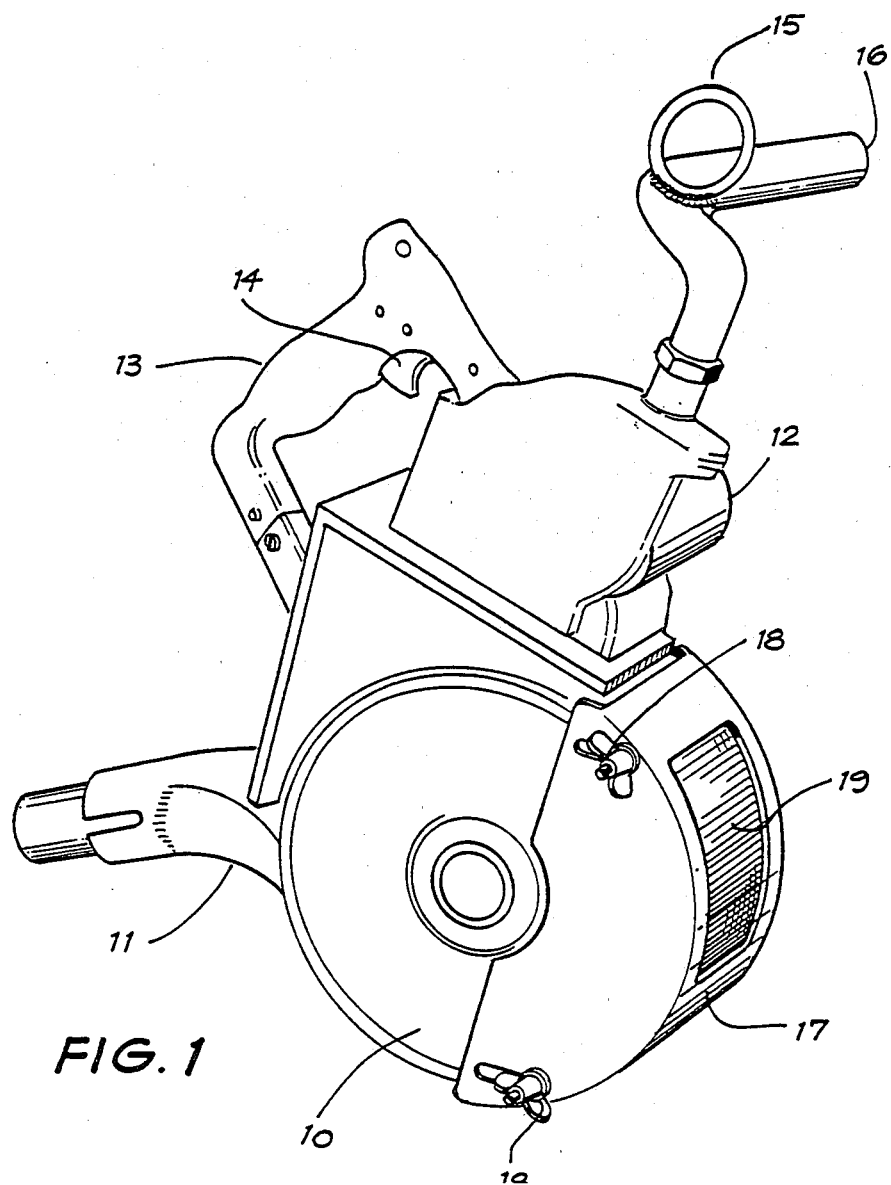
FIG. 1 is a perspective view of a cashmere combing machine embodying the invention.

FIG. 1 shows the general configuration of the cashmere combing machine embodying the invention and which shows a housing 10 within which is mounted a rotatable hub member supporting two pivotally mounted combs (not shown). Manifold 11 is arranged for connection to a vacuum cleaner or the like to cause a flow of air past the combs after each moved through the coat of the animal being combed to remove therefrom the hair collected. An electric motor is mounted within casing 12 and is arranged to drive the rotatable hub within housing 10. An adjustable face plate 17 is fitted to the front of the machine with threaded bolts and wingnuts 18. The face plate is provided with opening 19 through which the combs may move during use of the machine. Handles 13 and 16 are provided for use by the operator to control the machine while trigger switch 14 is used to operate the electric motor. A support ring 15 on handle 16 is provided to take the bulk of the weight of the machine leaving the operator having merely to move the machine about as required without having to support the weight of the machine.

Figure 2:
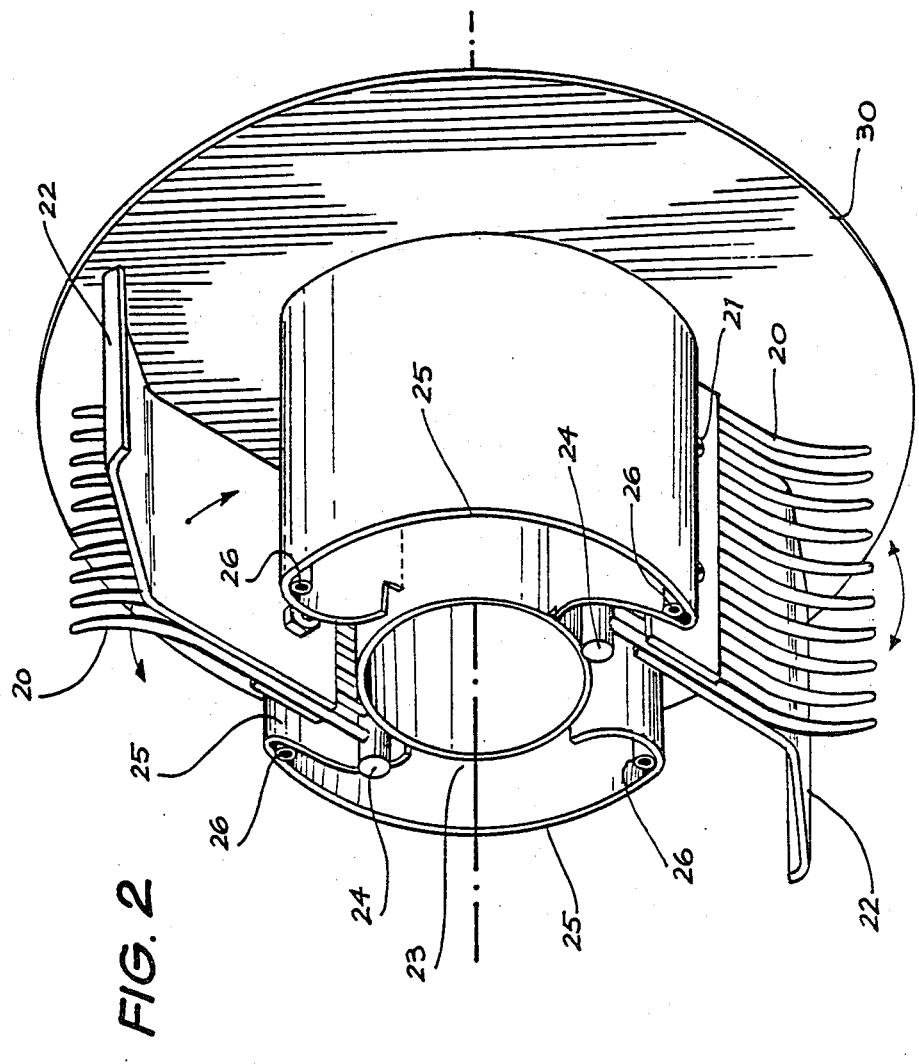
FIG. 2 is a perspective view of part of a rotatable hub member included in the machine of FIG. 1.

FIG. 2 shows two combs 20 respectively secured to comb spines 24. Bolts 21 are used to attach self plates 22 to the two combs 20 respectively. Circular side plates 30 (only one of which is shown) are secured to rotatable hub 23 in spaced-apart, coaxial parallel relation in planes normal to the axis of rotation of the hub, and on either side of the combs. The comb spines 24 are pivotally secured to these side plates by locating end portions of the spines into holes (not shown) provided in the side plates.

Assembly pieces 25 are located and secured between the side plates and between the comb assemblies, using rods 26. These pieces are important elements of the apparatus since they prevent hair wrapping around the rotatable hub.

Figure 3:
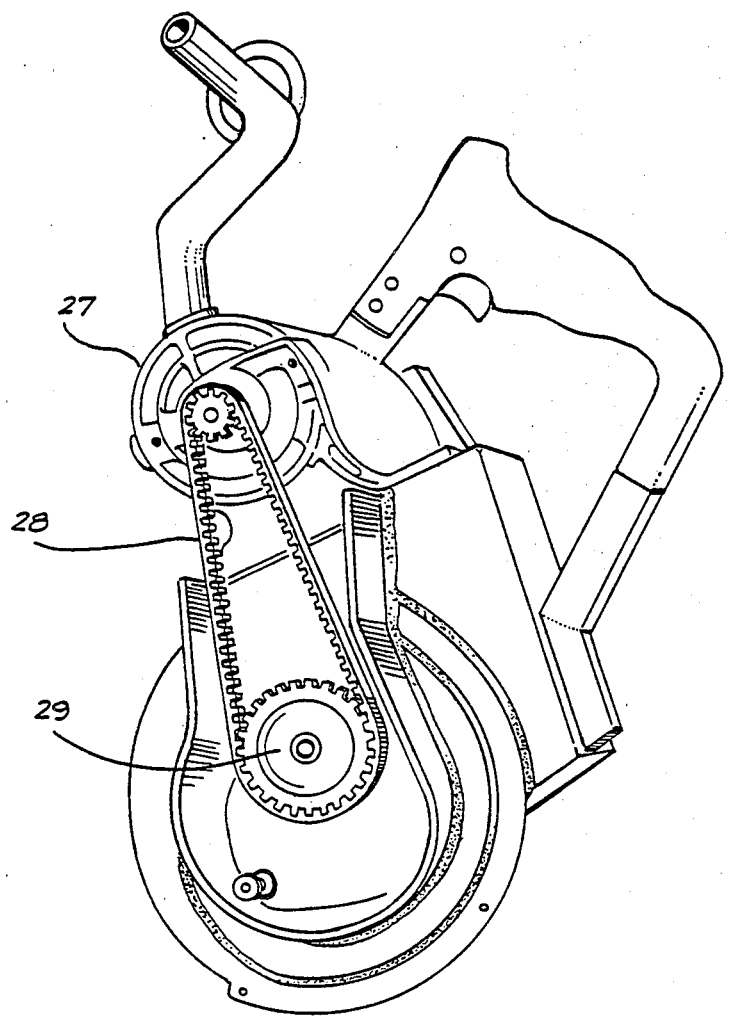
FIG. 3 is a perspective view of the machine of FIG. 1 taken from a different angle.

In FIG. 3, a belt drive cover plate is removed to show the mechanical connection via belt 28 between electric motor 27 and the input shaft 29 which gear drives an output shaft on which rotatable hub 30 is mounted.

Figure 4:
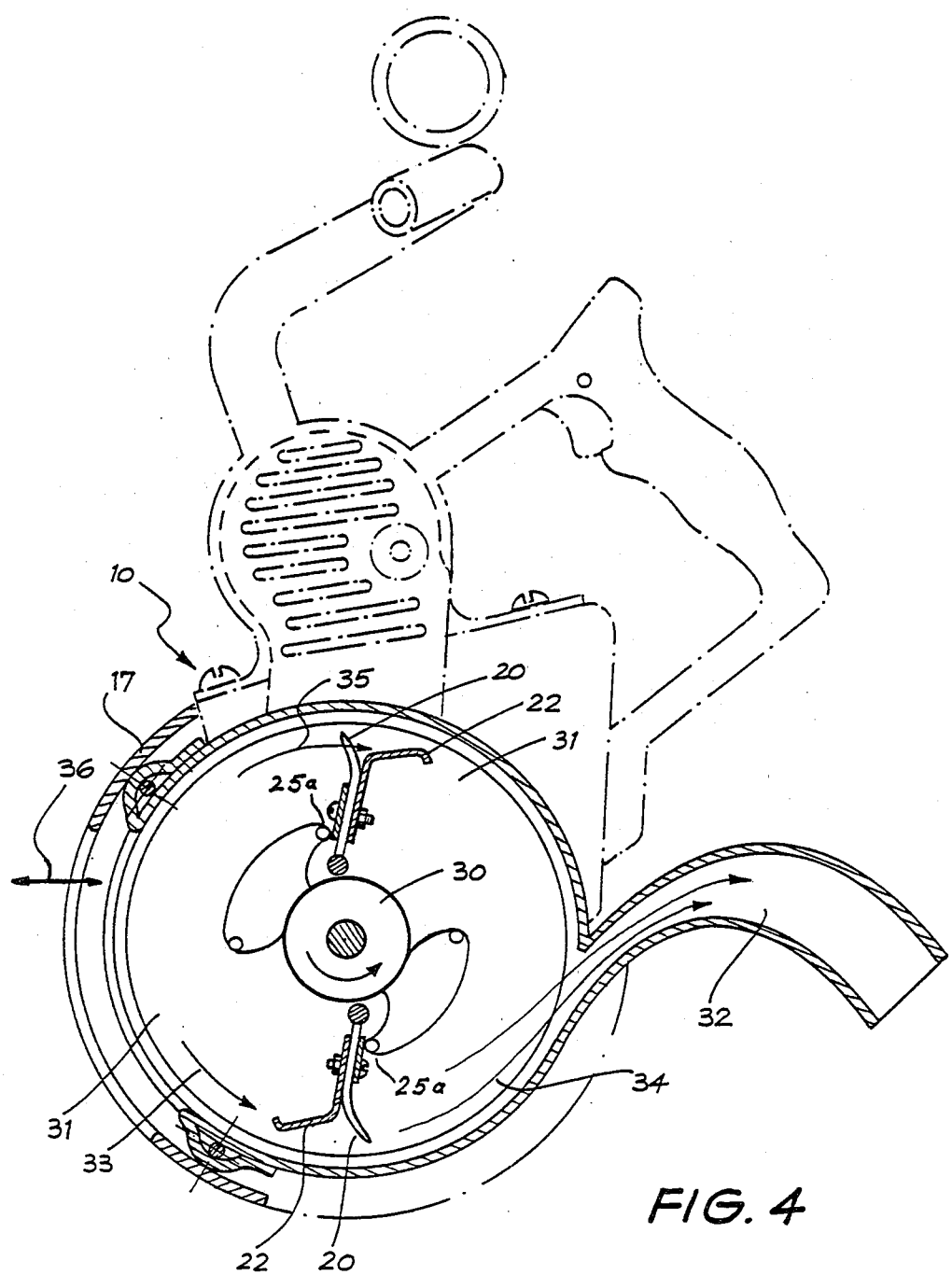
FIG. 4 is a sectional view of a portion of the machine of FIG. 1 taken in a plane normal to the axis of rotation of the rotatable hub.

FIG. 4 shows apparatus housing 10, which is provided with means to support rotatable hub 30, and which fully encloses the rotating comb/side plate assembly except for an opening 31 at the "front" thereof, which opening is moved over the coat of the animal being combed during the combing process. The housing is fitted with adjustable face plate 17 the "face" of which may be positioned at varying distances from the housing to adjust the depth of penetration of the combs into the coat of the animal being combed, and as indicated by arrow 36. The position of the face plate is set using wing nuts 18 shown in FIG. 1. At the rear of the housing a suction application manifold 32 provides the path for the hair removed from the combs by the flow of air across the combs caused by the application of the suction.

In the operation of the device, the rotation of hub 30 generates centrifugal forces on the comb/shelf plate assemblies, that is they are subject to forces pulling them radially away from the axis of rotation of hub 30. When the front of the apparatus is brought into contact with the hair of the animal, the fingers of the combs commence combing through that hair. The rotatable hub 30 is designed to be rotated in the direction indicated by arrow 33. As each comb passes through the hair, the pivotal securing arrangement of the comb/shelf plate assemblies allows the combs to fold back if either is caught in a knot in the hair, or if the whole apparatus is pushed too far into the animal's coat, the negative rake presented by the combs in the folded back position allowing the combs to harmlessly slide out of knots and over the animals's skin.

Once each comb has completed a pass across the opening 31 and through the hair, a flow of air created by the suction applied via manifold 32 is directed past the comb in the direction of arrow 34. This air flow lifts the collected hair from the comb and carries it away through manifold 32 to an appropriate storage area. The cycle is a continuous one with each comb repeatedly undergoing collection and suction removal phases.

The location of the manifold 32 with respect to the position of the opening 31 is important to the creation of the good suction effects required by the device at both the time the combs each pass through the hair of the animal and at the time when the hair is being sucked from the combs. The correct relative positioning of the these components prevents, to a considerable extent, the loss of suction effect through undesirable "leakage" of air into the housing via alternate routes.

Thus the manifold is located so that as one comb is in the latter stage of its passage through the hair on the animal, the other is to a large extent blocking the alternative air passage between the opening 31 and the manifold 32. This alternative air passage is illustrated as air path 35 in FIG. 4.

Similarly, as each comb which is "loaded" with collected hair approaches the manifold, the suction on the comb applied via the manifold is maintained relatively strong by the blocking of the air path 35 by the other comb of the device, and its associated shelf plate. This suction at this stage has the effect of loosening the hair prior to its removal once the comb is at or near the manifold 32.

Particular reference is made to the shape of the "fingers" of combs 20. To prevent jamming of the hair between the fingers of the combs, the fingers are bent part way along their length at a predetermined angle. This bending provides a "hook" effect which traps the hair at the bend in the hook, and so prevents it passing between the fingers at their roots (i.e. the point where they are secured to the "shelf" plate) and jamming there. Also, each finger is tapered at the end closer to the tip. The tapering begins at the bend and the fingers are finer towards the tips. The tapering makes it relatively easy to dislodge the hair from the comb once it is exposed to the suction. The angle of bend in the fingers as shown in this embodiment is about 30°. Further, during normal operation of the machine, the combs are in contact with the assembly pieces 25 at the points marked 25a so that the tips of the comb fingers pass through the animal hair at an angle of about 15° to a line normal to the instantaneous direction of travel of the comb.

The metal shelf plates serve the function of helping to prevent the hairs from jamming in the fingers of the comb. The spaced relation between the fingers and the shelf plates defines the positioning of the combed hairs in that following collection they are looped over the fingers of the combs, lodging on the bend therein, and lying loosely across the shelf plate. This non-jamming collection arrangement is critical to the provision for the easy removal of the collected hair from the comb fingers by the action of the suction means. Also, the shelf plates cause increased velocity of air past the combs since they restrict the cross sectional area of the air path, and confine the air flow to that part of the combs beyond the bend.

Also for the reason of increasing the velocity of the air past the combs, the housing itself is shaped to provide an air flow path of relatively small cross-section.

It should also be noted that the opening at the front 31 of the housing is narrower than the distance between the rotating side plates to prevent hair fibres entering the gap between the rotating side plates and stationary sides of the housing (not shown). In this way long coarse hairs are prevented from wrapping around the shaft supporting the rotating hub. Also, the relatively large surface area of housing around the front opening 31 prevents the operator from pushing the apparatus too deeply into the animal's coat (if a face plate is not being used) which, despite the negative rake on the comb teeth, may result in the jamming of the combs in the coat and possible injury to the animal.

I claim:

1. An apparatus for the removal of hair from an animal comprising driven comb means for collecting the hair and a housing for the comb means and within which the comb means is arranged to be driven, the housing having an inlet which exposes the comb means so that it can be moved through the hair of the animal, an outlet for the discharge of hair collected from the animal and means permitting connection of the outlet to a suction means so that when in use the suction means creates an air flow which is applied to the collected hair to facilitate its removal from the comb means; the comb means comprising at least one comb which in turn comprises a comb spine to which is attached a plurality of fingers which are each tapered convergently towards tips thereof, each finger being bent part way along its length such that in use the tip of each finger is inclined in the direction of travel of the comb through the hair of the animal, characterised in that the or each said comb is mounted on a rotatable hub member in such a way that the or each comb is substantially freely pivotally displacable through an arc of movement for all rotary positions of the hub member, the suction means being arranged to cause a flow of air past the or each said comb after it has been moved through the hair of the animal to remove therefrom any hair collected by it.

2. An apparatus as claimed in claim 1 wherein the comb means comprises two said combs and wherein circular side plates are secured to the rotatable hub member in a spaced apart parallel coaxial relation and disposed in planes normal to the axis of rotation of the hub and on either side of the combs, and wherein assembly pieces are arranged to extend around the rotatable hub and are secured thereto between respective combs.

3. An apparatus as claimed in claim 2 in which said combs are each attached to a shelf plate which is in turn pivotally mounted to the side plates at points adjacent the rotatable hub, the axis of rotation of each shelf plate about its respective pivotal mounting being substantially parallel to the axis of rotation of the hub.

4. An apparatus as claimed in claim 2 in which the spines of the combs are pivotally mounted to the side plates at points adjacent the rotatable hub, and shelf plates are attached to the combs.

5. An apparatus as claimed in claim 2 in which the spines of the combs are pivotally mounted to the rotatable hub and shelf plates are attached to the combs.

6. An apparatus as claimed in any one of claims 3 to 5 in which the apparatus housing is arranged to totally enclose the rotatable hub and the combs, shelf plates and side plates associated therewith, except for an opening in the front of the housing and a manifold for the connection of said suction means, said housing and said shelf plates being arranged to provide a reduced cross section air path for the flow of air past each comb generated by the suction means to remove the hair therefrom.

7. An apparatus as claimed in claim 1 in which an adjustable face plate is secured to the apparatus housing to allow control of the depth of penetration of the comb means into the animal's coat.

8. An apparatus as claimed in claim 1 wherein the comb means is driven by an electric motor or the like located on the apparatus.

9. An apparatus as claimed in claim 1 in which the suction means is a suction device such as a vacuum cleaner arranged to provide the required suction to cause the flow of air past the comb means for the removal therefrom of the collected hair.

10. An apparatus as claimed in claim 1 in which the comb means is driven by an electric motor the power from which is transmitted to the apparatus via a flexible drive connection.

11. An apparatus for the removal of hair from an animal comprising driven comb means for collecting the hair and a housing for the comb means and within which the comb means is arranged to be driven, the housing having an inlet which exposes the comb means so that it can be moved through the hair of the animal, an outlet for the discharge of hair collected from the animal, and means permitting connection of the outlet to a suction means so that when in use the suction means creates an air flow which is applied to the collected hair to facilitate its removal from the comb means; characterised in that the comb means comprises at least one comb in turn comprising a spine and a plurality of comb fingers, the comb or combs being mounted on means to impart continuous closed-loop rotary movement of the comb or combs about an axis, the spine of the or each comb being located generally parallel to the axis of the movement, the suction means being arranged to cause a flow of air past the or each said comb after it has been moved through the hair of the animal to remove therefrom any hair collected thereon.

12. An apparatus as claimed in claim 11, in which the comb fingers are each tapered convergently towards tips thereof, and each finger is bent part way along its length such that in use the tips of each finger is inclined in the direction of travel of the comb through the hair of the animal.

13. An apparatus as claimed in claim 11 wherein the means to provide continuous closed-loop rotary movement of the combs about an axis comprises a rotatable hub member to which the combs are fixed.

* * * * *